United States Patent

Ito et al.

[11] Patent Number: 6,066,070
[45] Date of Patent: May 23, 2000

[54] CONTROL SYSTEM OF VEHICLE HAVING CONTINUOUSLY VARIABLE TRANSMISSION

[75] Inventors: Yasushi Ito, Susono; Hirofumi Kubota, Toyota, both of Japan

[73] Assignee: Toyota Jidosha Kabushiki Kaisha, Toyota, Japan

[21] Appl. No.: 09/290,482

[22] Filed: Apr. 12, 1999

[30] Foreign Application Priority Data

Apr. 28, 1998 [JP] Japan .................................. 10-119771
Dec. 25, 1998 [JP] Japan .................................. 10-371313
Feb. 5, 1999 [JP] Japan .................................. 11-029202

[51] Int. Cl.$^7$ .............................. F16H 9/00; B60K 41/12
[52] U.S. Cl. ................................. 477/43; 477/48; 477/906
[58] Field of Search ................................ 477/43, 48, 906

[56] References Cited

U.S. PATENT DOCUMENTS 5,803,862  9/1998  Ochiai et al. .............................. 477/46
5,944,626  8/1999  Spiess et al. .............................. 477/48

FOREIGN PATENT DOCUMENTS 3-72867  11/1991  Japan .

OTHER PUBLICATIONS

Takeshi Takiyama, et al., "Simultaneous Control for Optimization of Fuel Consumption and Sensitivity of an Accelerator Pedal by Engine–CVT Consolidated Control," Transactions of The Japan Society of Mechanical Engineers, vol. 62, No. 593, (Jan. 1996), pp. 386–391.

*Primary Examiner*—Dirk Wright
*Attorney, Agent, or Firm*—Oblon, Spivak, McClelland, Maier & Neustadt, P.C.

[57] ABSTRACT

A control system controls the output of a power source of a vehicle having a continuously variable transmission and a gear ratio to be set by the continuously variable transmission. The control system determines a target driving force on the basis of an output demand and a vehicle speed, and determines a target output of the power source for achieving the target driving force. The control system determines a target output speed preset for the target output, and controls the gear ratio of the continuously variable transmission so that the actual output speed of the power source may become the target output speed. The control system further determines the target output torque of the power source on the basis of the target output and the actual output speed of the power source, and controls the power source to achieve the target output torque. When the gear ratio is to be changed, its changing rate is made different in at least two quick and slow states. Moreover, the target output speed is provided with an upper limit, which is changed.

24 Claims, 11 Drawing Sheets

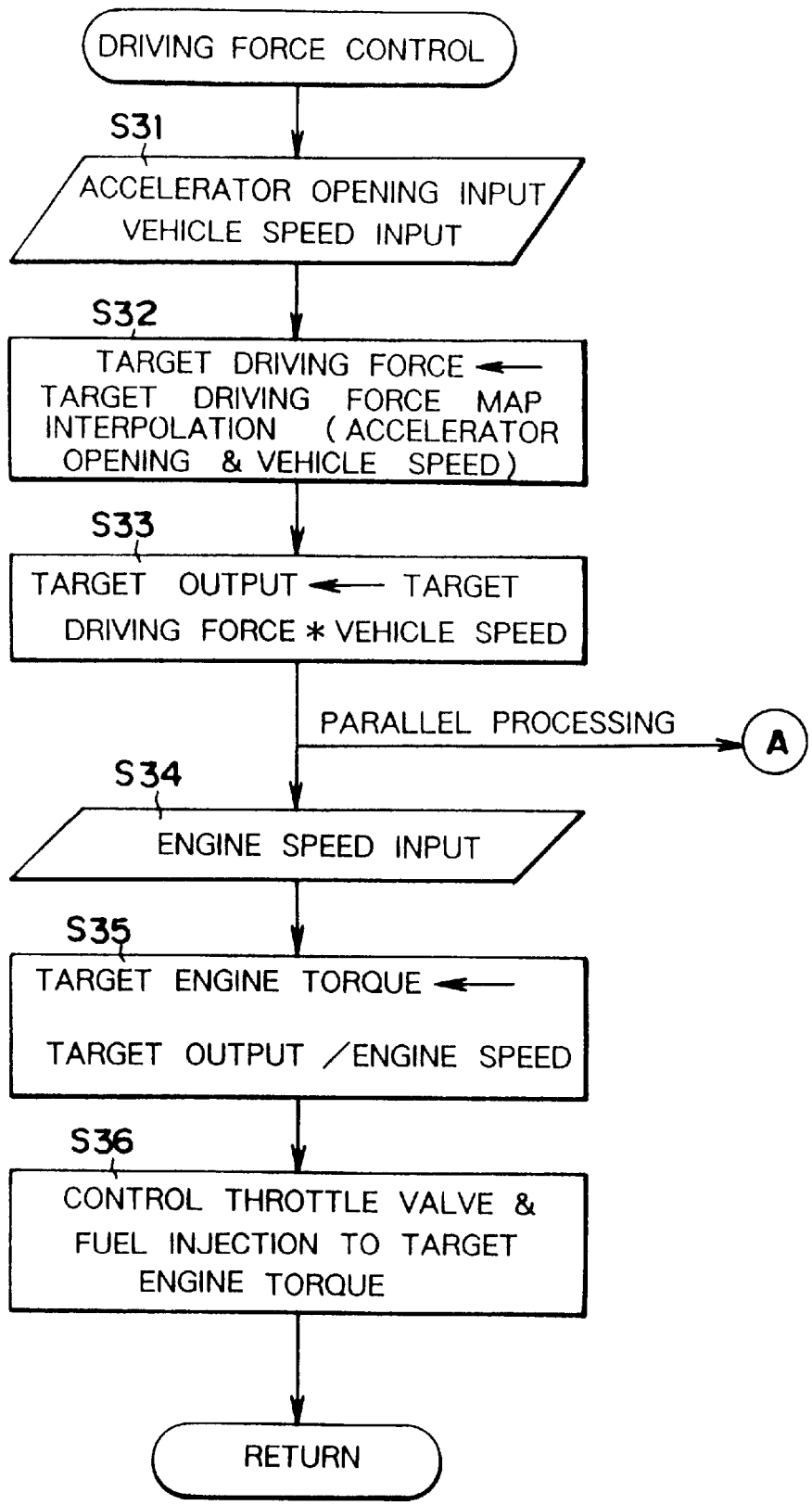
FIG.8A — EXECUTED FOR EVERY Δt

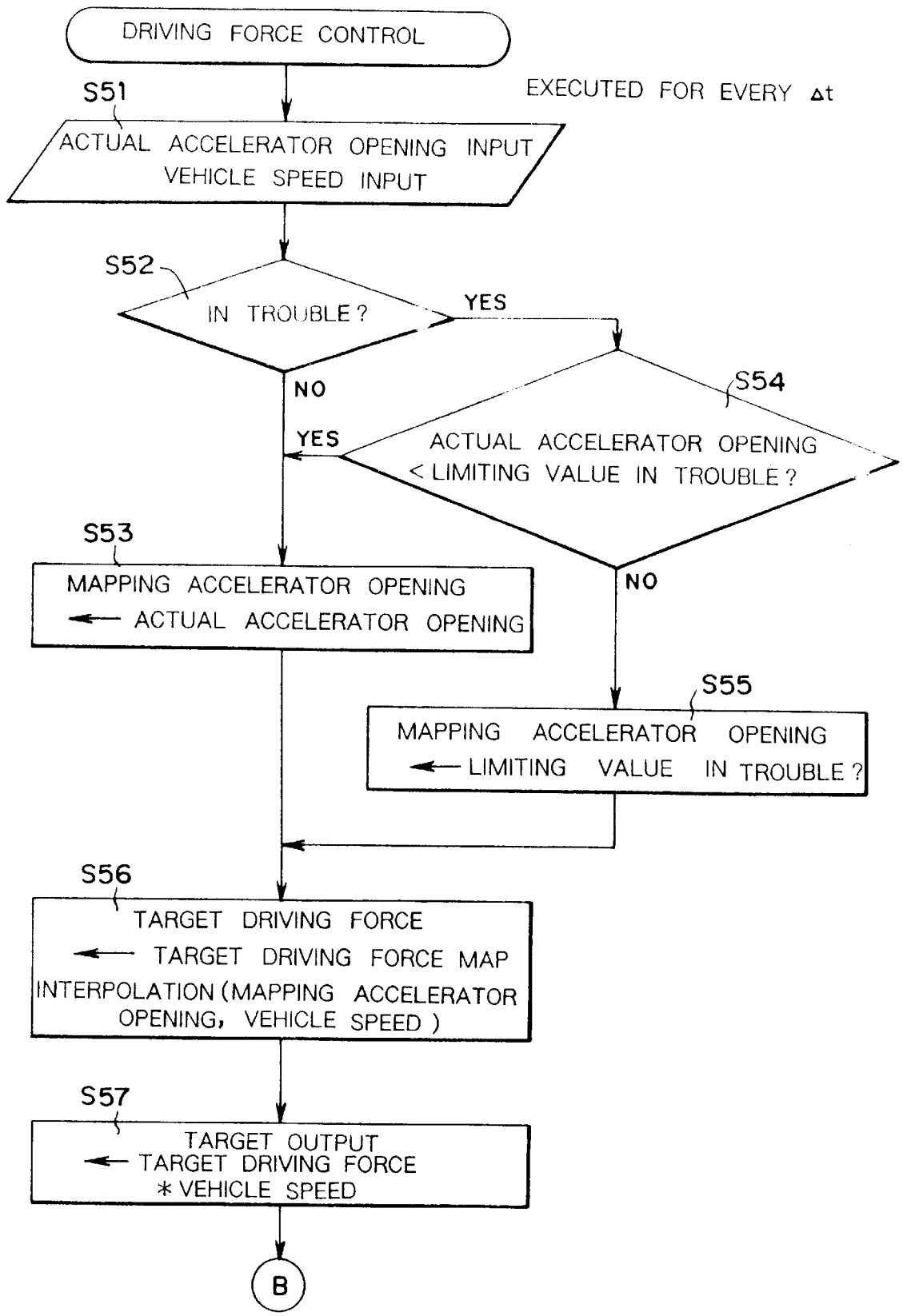

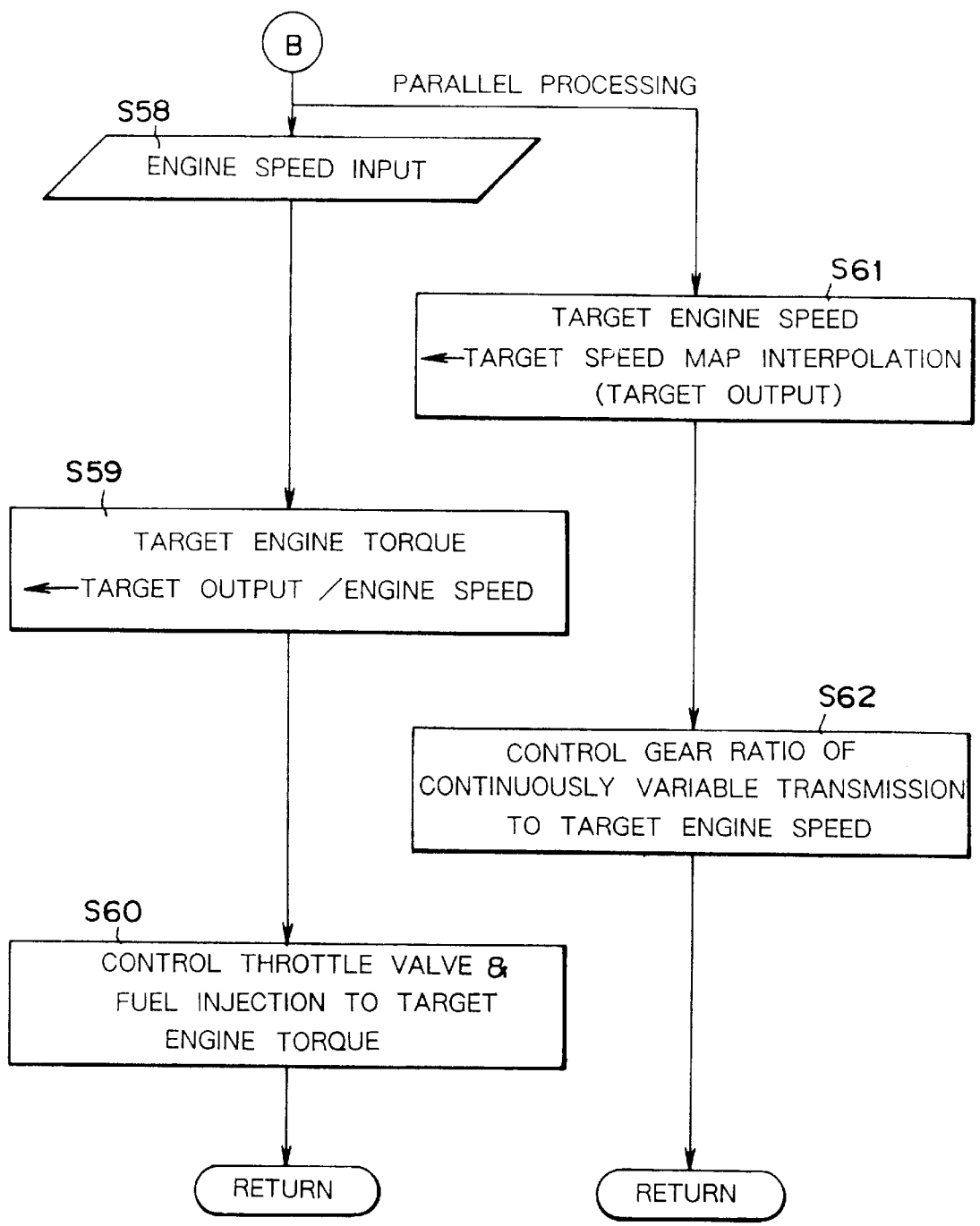

CONTROL SYSTEM OF VEHICLE HAVING CONTINUOUSLY VARIABLE TRANSMISSION

BACKGROUND OF THE INVENTION

1. Field of the Invention

The present invention relates to a control system of a vehicle having a continuously variable transmission capable of changing a gear ratio continuously and, more particularly, to a control system for controlling both a power source and a gear ratio in response to a demand for a driving force.

2. Related Art

In recent years, a continuously variable transmission has been adopted as a transmission for a vehicle. The continuously variable transmission of this kind is so constructed that the gear ratio is continuously changed by changing the groove width of an input side pulley and an output side pulley, on which a belt is made to run, that is, a belt winding radius, or that the gear ratio is continuously changed by inclining a power roller interposed between an input side disc and an output side disc, each of which has a troydal face, to change the radius of the position for the power roller to contact with the input side disc and the output side disc. Moreover, the gear ratio is controlled on the basis of the running state of the vehicle, which is decided, for example, from a depression angle (or accelerator opening) signal of an accelerator pedal, as indicating the output demand of a driver, an output demand signal coming from a cruise control for keeping the vehicle speed at a constant speed, and the vehicle speed.

According to the continuously variable transmission, the gear ratio can be continuously changed, and the output of the power source such as an engine is continuously changed. In Japanese Patent Publication No. 72867/1991 (JPB3-72867), therefore, there is disclosed a control system which is constructed to perform a run of excellent efficiency by making use of the characteristics of the continuously variable transmission effectively. In the disclosed system, the target driving force is determined from the accelerator pedal depression and the vehicle speed to determine the target engine output corresponding to the target driving force, the target throttle opening and the target engine speed, and the target gear ratio is determined on the basis of the target engine speed and the vehicle speed. In the disclosed system, moreover, the target engine output and the target gear ratio are determined on the basis of an optimum fuel economy curve.

According to the control system of the prior art thus far described, therefore, when the accelerator pedal is depressed, for example, the target driving force and the target vehicle speed are determined on the basis of the accelerator pedal depression and the vehicle speed, and the change from the running state at that time to the target running state occurs along the best fuel economy curve. In the system of the prior art, therefore, even when an acceleration is demanded by depressing the accelerator pedal, the controls to increase the fuel supply temporarily and to raise the engine speed temporarily are not made, but what is controlled is to optimize (or minimize) the fuel consumption. As a result, the engine torque or the driving torque fails to satisfy the demand for acceleration of the driver, and the vehicle may have an inferior power performance and a poor drivability.

SUMMARY OF THE INVENTION

A main object of the invention is to make compatible improvements in the fuel economy and the drivability of a vehicle having a continuously variable transmission.

The control system of the invention determines a target torque, when a driving force is demanded, on the basis of a corresponding target output of the power source and the actual output speed (or vehicle speed), to control the power source to the target torque. When a demand for acceleration is made, therefore, an output torque according to a target output at that time is achieved so that a driving torque satisfying the acceleration demand is generated. In other words, the vehicle has an excellent power performance and an excellent drivability.

According to the invention, on the other hand, the target driving force can be determined on the basis of a preset map so that the characteristics of the demand for the driving force and the acceleration can be easily set.

According to the invention, moreover, the shifting rate of the gear ratio of the continuously variable transmission is changed in at least two quick and slow states till the actual speed of the power source reaches the target speed. In the invention, therefore, after the gear ratio quickly changed, for example, the gear ratio changes at a slower shifting rate. When a target output is determined, more specifically, a target output torque is determined from the target output so that the power source is controlled to generate the target output torque. If the shift is based on the output raising demand, for example, the gear ratio is quickly changed so as to establish the rotating speed of the power source according to the target output. As a result, the driving force according to the demand is generated, but the speed of the power source does not change independently of the change in the vehicle speed. At the shift to the target output speed preset for the target output after this output was achieved, on the other hand, the gear ratio is slowly changed to bring the change in the vehicle speed and the change in the speed of the power source into a corresponding state thereby to prevent a feeling of disorder.

In the invention, the target output speed of the power source is limited to a predetermined limiting value, and this limiting value is gradually changed to the target output speed which is determined by means for determining the target output speed preset for the target output. According to the invention, therefore, even when the change in the output demand is high, the output speed of the power source does not instantly change to the target speed preset for the target output but is determined by the limiting value, so that the speed of the power source gradually changes toward the target speed preset for the target output according to the change of the limiting value. When the acceleration demand is made, for example, the speed of the power source changes in relation to the rise in the vehicle speed so that the change in the behavior of the power source coincides with the change in the behavior of the vehicle thereby to avoid the feeling of disorder in advance.

In the invention, moreover, a trouble in either the power source or the continuously variable transmission or a trouble in a control line for either of the power source or the continuously variable transmission is detected to execute a limiting control for limiting the target output. According to the invention, therefore, when the trouble is detected, the control to limit the target output is executed so that the target output becomes smaller than the output demand, thereby to reduce the output torque, as set on the basis of the target output, of the power source and the gear ratio of the continuously variable transmission. As a result, the power transmission line, to which the output of the power source is transmitted, is prevented in advance from being exposed to an excessive load in a trouble state so that it can be effectively protected.

The above and further objects and novel futures of the invention will more fully appear from the following detailed description when the same is read with reference to the accompanying drawings. It is to be expressly understood, however, that the drawings are for the purpose of illustration only and are not intended as a definition of the limits of the invention.

BRIEF DESCRIPTION OF THE DRAWINGS

FIG. 8A is a part of a flow chart for explaining still another embodiment of the invention;

FIG. 10A is a part of a flow chart for explaining another embodiment of the invention;

FIG. 10B is another part of the flow chart for explaining another embodiment of the invention.

DETAILED DESCRIPTION OF THE PREFERRED EMBODIMENTS

Figure 4:
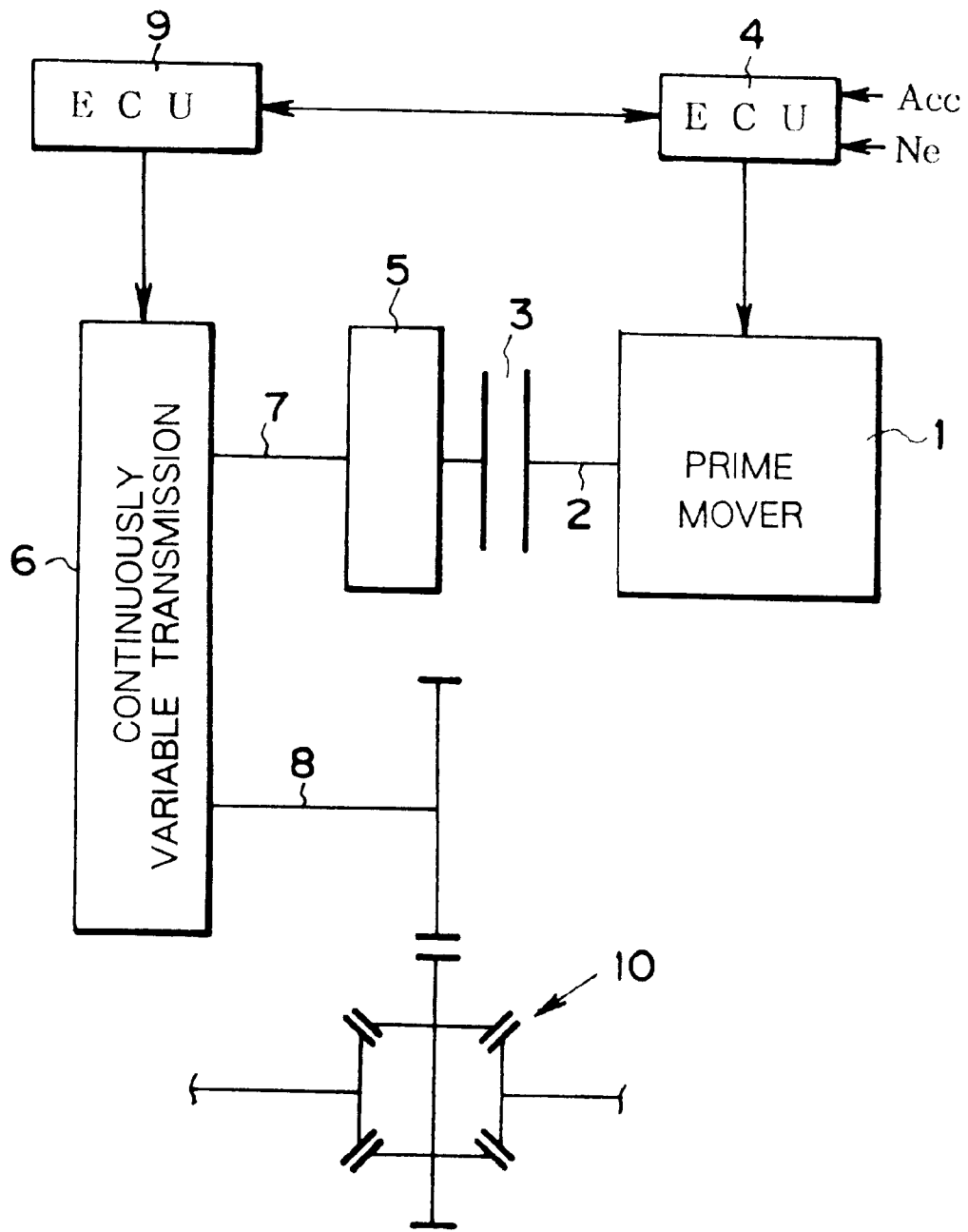
FIG. 4 is a block diagram schematically showing one example of a power transmission system to which the invention can be applied.

The invention will be described in connection with its specific embodiment. Here will be described at first an example of a power transmission system of a vehicle to which the invention is applied. In FIG. 4, a prime mover 1 has an output shaft 2 connected to a transmission unit 3. Here, the prime mover 1 includes a variety of power sources to be used in the vehicle, such as an internal combustion engine, e.g., a gasoline engine or a Diesel engine, an electric motor, e.g., a motor, or a unit having the internal combustion engine and the electric motor combined. Here will be described an example in which the engine is adopted as the prime mover 1.

This engine 1 is so constructed that it can be electrically controlled. For this control, there is provided an electronic control unit (ECU) 4 which is constructed mainly of a microcomputer. This control unit 4 is constructed to control at least the output of the engine 1 and is fed with output demand signals including an output shaft speed Ne and an accelerator opening Acc as data for the control.

In short, these output demand signals are those for increasing/decreasing the output of the engine 1 and can be exemplified by either an operation signal of a (not-shown) accelerator pedal to be operated by the driver or a signal which is produced by processing the operation electrically. In the case of the engine 1 equipped with an electronic throttle valve, on the other hand, the output demand signals further include a control signal for controlling the opening of the electronic throttle valve and an output demand signal coming from a (not-shown) cruise control system for keeping the vehicle speed at a set value.

On the other hand, the transmission unit 3 enables the engine 1 to rotate even when the vehicle stops. As this transmission unit 3, there can be adopted, if necessary, a variety of devices such as a general clutch for transmitting the torque when its friction plates are forced to contact, a fluid coupling, a fluid type torque converter, a torque converter having a built-in lockup dutch, an electromagnetic clutch or a powder clutch.

This transmission unit 3 is coupled to a forward/backward switching mechanism 5. This switching mechanism 5 is provided because a later-described continuously variable transmission 6 cannot invert its input. The forward/backward switching mechanism 5 is equipped with three rotary elements of a planetary gear mechanism: one of which is coupled to the transmission unit 3 to act as an input element; another of which is a fixed element to be selectively fixed; and the remaining one of which acts as an output element. The output element is rotated in the opposite direction to the input element by fixing the fixed element with a brake mechanism or the like, and the switching mechanism 5 is rotated in its entirety to output the input as it is, by releasing the fixed element from the fixed state and by coupling any two rotary elements integrally.

Here will be described the continuously variable transmission 6 which is coupled to that forward/backward switching mechanism 5. In short, the continuously variable transmission 6 is a mechanism for changing the ratio between the rotating speeds of an input shaft 7 and an output shaft 8 continuously. Specifically, the continuously variable transmission 6 is of a suitable type such as the belt type or the toroidal type. There is further provided an electronic control unit (ECU) 9 for controlling the gear ratio electrically. This electronic control unit 9 is so connected with the electronic control unit 4 for the engine 1 as to perform data communications and is fed with data necessary for controlling the gear ratio.

Moreover, the output shaft 8 of the continuously variable transmission 6 is coupled to a final speed reducing mechanism (or differential gear) 10 which distributes the torque between right and left wheels while allowing their differential rotations.

When the vehicle makes a steady run, the control system thus constructed according to the invention controls the engine 1 and the gear ratio along the optimum running line in a running state diagram which is determined by the rotating speed and the torque. On the contrary, the following controls are made when there arises a demand for increasing or decreasing the driving force.

Figure 1:
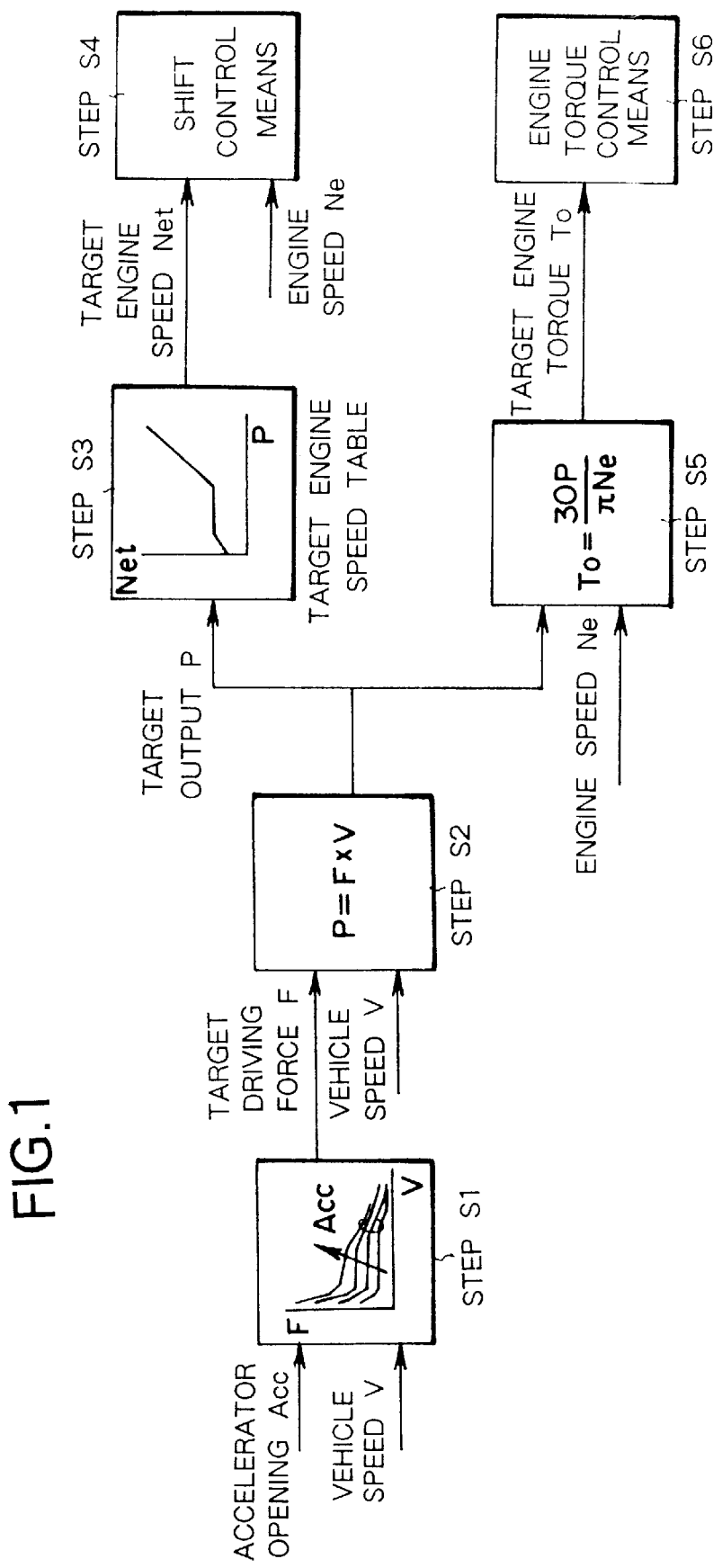
FIG. 1 is a block diagram for explaining a control embodiment of the invention.

FIG. 1 is a block diagram for explaining the control procedure. On the basis of the accelerator opening Acc and the vehicle speed V, a target driving force F is determined (at Step S1). Here, the accelerator opening Acc is the control data which is prepared by processing the depression of the accelerator pedal electrically, and is adopted as a parameter indicating a demand for the acceleration or deceleration, i.e, a demand for the driving force. Therefore, the signal of the drive demand for the cruise control to keep the vehicle speed constant can be adopted as the parameter in place of the accelerator opening Acc. Likewise, the rotating speed of another suitable rotary member in a one-to-one relation to a vehicle speed V can be adopted in place of the vehicle speed V. Therefore, the function of Step S1 corresponds to means for determining the target driving force in the invention.

The determination of the target driving force F on the basis of the accelerator opening Acc and the vehicle speed V is made on the basis of a predetermined map. Specifically, the relation between the vehicle speed V and the driving force F is predetermined as the map by using the accelerator opening Acc as the parameter. In this case, the driving force F is so determined as to reflect the characteristics of the vehicle to which the invention is applied. On the basis of this map, moreover, the target driving force F is determined.

On the basis of the target driving force F, as determined at Step S1, and the actual vehicle speed V, a target output P is determined (at Step S2). In short, the target output P is a product of the target driving force F and the vehicle speed V. Therefore, the function of this Step S2 corresponds to means for determining the target output in the invention.

In order to control the gear ratio, a target engine speed Net corresponding to the target output P is determined (at Step S3). In the steady running state, the control is made according to the optimum running line, as described hereinbefore, so that the running state at the time when the target output P is reached lies on the optimum running line. At the time when the target output P is reached, specifically, the engine 1 is controlled to the state based on the best fuel economy curve so that the target engine speed Net is determined by making use of the target engine speed table (or diagram) determining the output and the speed on the basis of the best fuel economy curve.

The shift control means controls the gear ratio (at Step S4) so that the actual engine speed may be the target engine speed on the basis of the target engine speed Net and the detected actual engine speed Ne. This shift control means is specified by the electronic control unit 9 which has been described with reference to FIG. 4. Therefore, the function of this Step S4 corresponds to means for controlling the gear ratio in the invention.

In order to control the engine 1, on the other hand, a target engine torque To is determined (at Step S5) on the basis of the aforementioned target output P and the actual engine speed Ne. This determination is made by dividing the target output P, for example, by the actual engine speed Ne. Here, the Formula, as expressed in FIG. 1, indicates the performance of the process for equalizing the units. Therefore, an angular velocity of the output shaft of the engine 1 can be adopted in place of the engine speed Ne. The function of this Step S5 corresponds to means for determining the target output torque in the invention.

The engine torque control means controls the engine 1 (at Step S6) so as to achieve the target engine torque To thus determined. Specifically, the fuel injection rate or the opening of the electronic throttle valve is controlled by the electronic control unit 4 which has been described with reference to FIG. 4. Therefore, the function of this Step S6 corresponds to means for controlling the power source in the invention.

Figure 2:
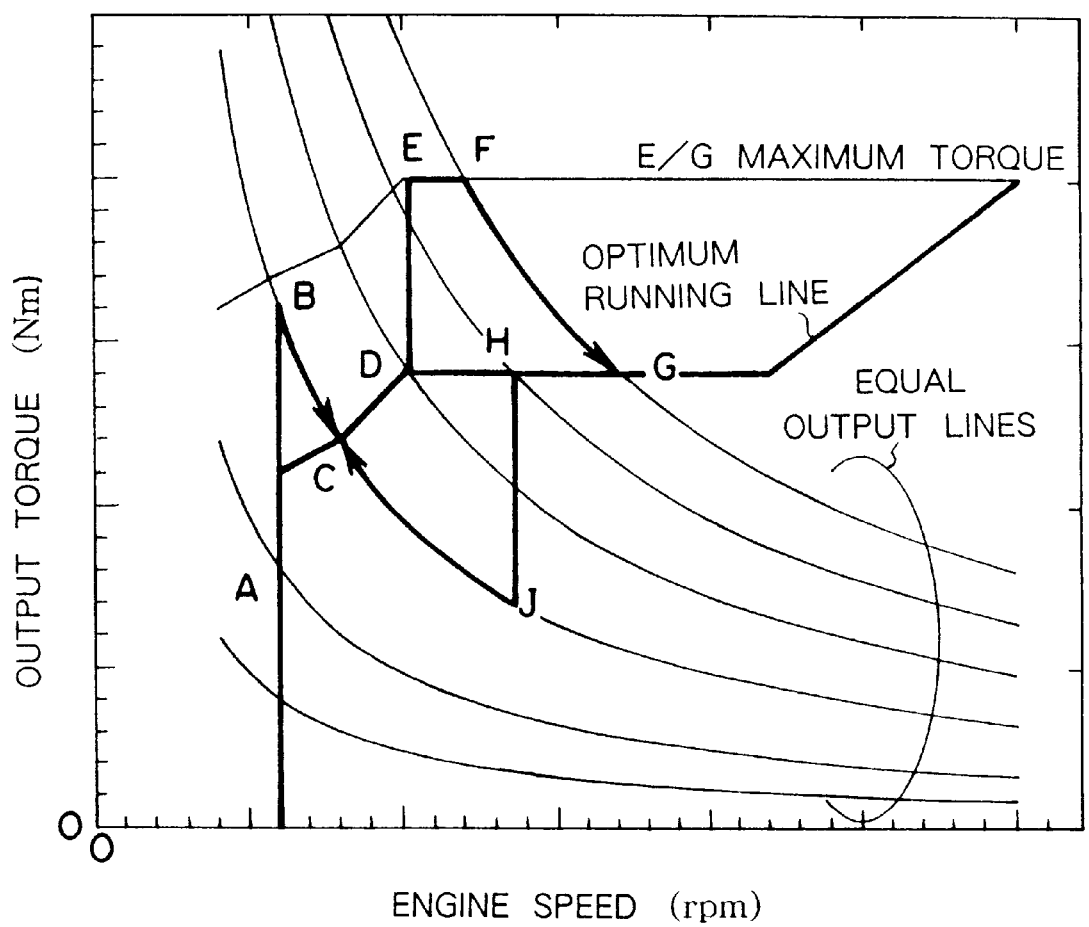
FIG. 2 is a diagram illustrating changes in the running state of the case in which engine is controlled by a control system of the invention.

In FIG. 2, there is shown an example of changes in the running state of the engine 1 in the case where the aforementioned control is made at an acceleration or deceleration of the vehicle. FIG. 2 illustrates the relations between the engine speed and the output torque (or axial torque) by employing equal output lines as parameters. The optimum running line is indicated by solid polygonal lines. If the acceleration demand is made by depressing the accelerator pedal when the running state is indicated by letter A, as shown in FIG. 2, and if the target running state determined by the accelerator opening Acc and the vehicle speed V is at a running point, as indicated by letter C, the running state is controlled to its target through a running point, as indicated by letter B.

Specifically, the target engine torque To to be calculated at Step S5 takes the value which is made by dividing the target output P by the actual (i.e., at the time of the running state A) engine speed (i.e., the angular velocity of the output shaft) so that it is the axial torque (at point B), as indicated by the point of the actual engine speed Ne on the equal output lines (i.e., the equal output lines of the target output P) in the running state C. This running state, as indicated by letter B, is located outside of the optimum running line. In the steady running state, however, the running state is controlled along the optimum running line. After all, the engine 1 is so controlled that the axial torque and the engine speed are changed along the equal output lines from the running state indicated by letter B, until the engine 1 reaches the target running state C.

According to the control system thus far described, therefore, the engine torque is augmented away from the optimum running line at the time when the acceleration demand is made, so that the driving torque is augmented accordingly. As a result, an accelerating force satisfying the demand can be achieved to improve the drivability (or power performance).

If the acceleration demand is made in the running state indicated by letter D and if the target running state is indicated by letter G, the axial torque is augmented to the maximum value for the engine speed at the acceleration demanding time. After this, the axial torque is maintained at the maximum value till the running state F in which the maximum torque is achieved on the equal output line for the output in the target running state G. This is because the acceleration demand is so high that the torque corresponding to the actual engine speed on the equal output line in the target running state G exceeds the maximum torque that is allowed for the engine 1. In the range between the running states indicated by letter E and F, the axial torque is limited to the maximum torque. When the engine speed then rises so that the resultant torque begins to become lower than the maximum torque, the running state changes along the equal output line in the target running state G and reaches the target running state G. In this case, therefore, the engine torque is augmented away from the optimum running line simultaneously with the acceleration demand so that a driving force satisfying the acceleration demand can be established.

Here will be described the case for the deceleration in contrast with this. When the running state is indicated by letter H in FIG. 2, for example, the accelerator opening Acc is decreased. If the target is the running state indicated by letter C, simultaneously with the decrease in the accelerator opening Acc, the engine torque (or axial torque) is lowered to the torque on the same equal output line as that for the target running state C with the engine speed at that time being left as it is. This running state is indicated by letter J. After this, the axial torque and the engine speed are changed to the target running state C, as located at the intersection between the equal output line for the target running state C and the optimum running line. In this case, too, the axial torque is lowered for the deceleration demand away from the optimum running line so that a driving force satisfying the deceleration demand can be achieved. If the drive wheels and the engine 1 are so coupled as to transmit the torque, that is, unless the power transmission line is cut by releasing a suitable clutch, it is possible to establish an engine braking force satisfying the deceleration demand.

Thus in the control system according to the invention, when a demand for increasing or decreasing the driving force, the torque is changed to the output torque corresponding to the actual engine speed on the equal output line of the target output and then to the torque on the optimum running line along that equal output line. In the system of the prior art, on the contrary, the torque is always controlled to the running state or the torque on the optimum running line. Between the system of the invention and the system of the prior art, therefore, there is a prominent difference in whether or not the engine is to be controlled away from the optimum running line at a transient time of the change in the driving force accompanying the acceleration/deceleration demand. More specifically, the system of the prior art controls the engine along the best fuel economy curve, whereas the system of the invention changes the torque of the engine to the torque on the equal output line for the target running state and then to the target running state along the equal output line.

Figure 3:
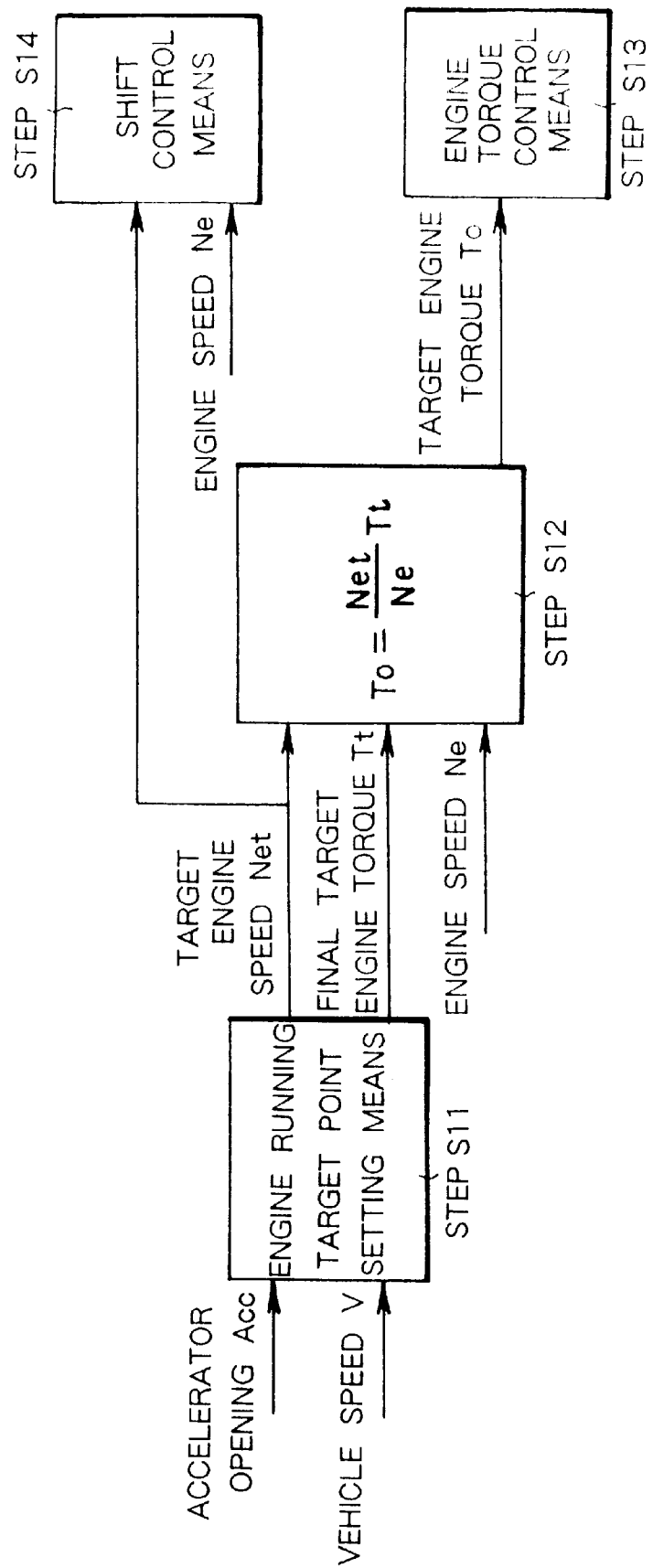
FIG. 3 is a block diagram for explaining another embodiment of the invention.

Here will be described another embodiment of the invention. FIG. 3 shows the embodiment which is constructed such that the driving force is made, at the shift transient time accompanying the acceleration/deceleration demand, to approximate the driving force after the shift end. First of all, the target running state is set (at Step S11) by engine running target point setting means. This setting is a control for setting the running state indicated by letter C or G in FIG. 2, for example. Like the embodiment shown in FIG. 1, the running state can be set by determining a demanded driving force on the basis of a demand for the driving force such as the accelerator opening Acc and the actual vehicle speed V and by further determining the target output or the demanded driving force.

Since an engine output is expressed by a product of a torque and an engine speed, the target engine speed Net and the final target engine torque Tt are determined from the target output determined in the aforementioned manner, and the target engine torque To is determined (at Step S12) from those values Net and Tt and the actual engine speed Ne. Specifically, the target engine torque To is determined by dividing the target output or the product of the final target engine torque Tt and the target engine speed Net by the actual engine speed Ne. Therefore, the function of this Step S12 is substantially identical to that of Step S5 shown in FIG. 1. The engine torque control means controls the engine 1 to establish the target engine torque To.

Since the target engine speed Net is determined at Step S12, on the other hand, the shift control means controls the gear ratio (at Step S14) on the basis of the target engine speed Net and the actual engine speed Ne.

In this embodiment shown in FIG. 3, therefore: the function of Step S11 corresponds to means for determining the target driving force, means for determining the target output and means for determining the target speed in the invention; the function of Step S12 corresponds to means for determining the target output torque in the invention; the function of Step S13 corresponds to means for controlling the power source in the invention; and the function of Step S14 corresponds to means for controlling the gear ratio in the invention.

In the invention thus far described, by making use of the fact that the output torque and the speed of the engine 1 can be controlled independently of each other, the torque is controlled away from the optimum running line at the beginning of a shift, and the shift is then performed to establish the running state at a running point on the optimum running line. In this case, depending upon the mode of changing the gear ratio, i.e., setting the shifting rate (i.e. changing rate of the gear ratio), there may occur a feeding of delay in the shift or an unintended change in the engine speed. In the invention, therefore, the shifting rate is controlled to change at a plurality of stages. This example will be described in the case where the running state is changed from point D to point G, as shown in FIG. 2.

Figure 5:
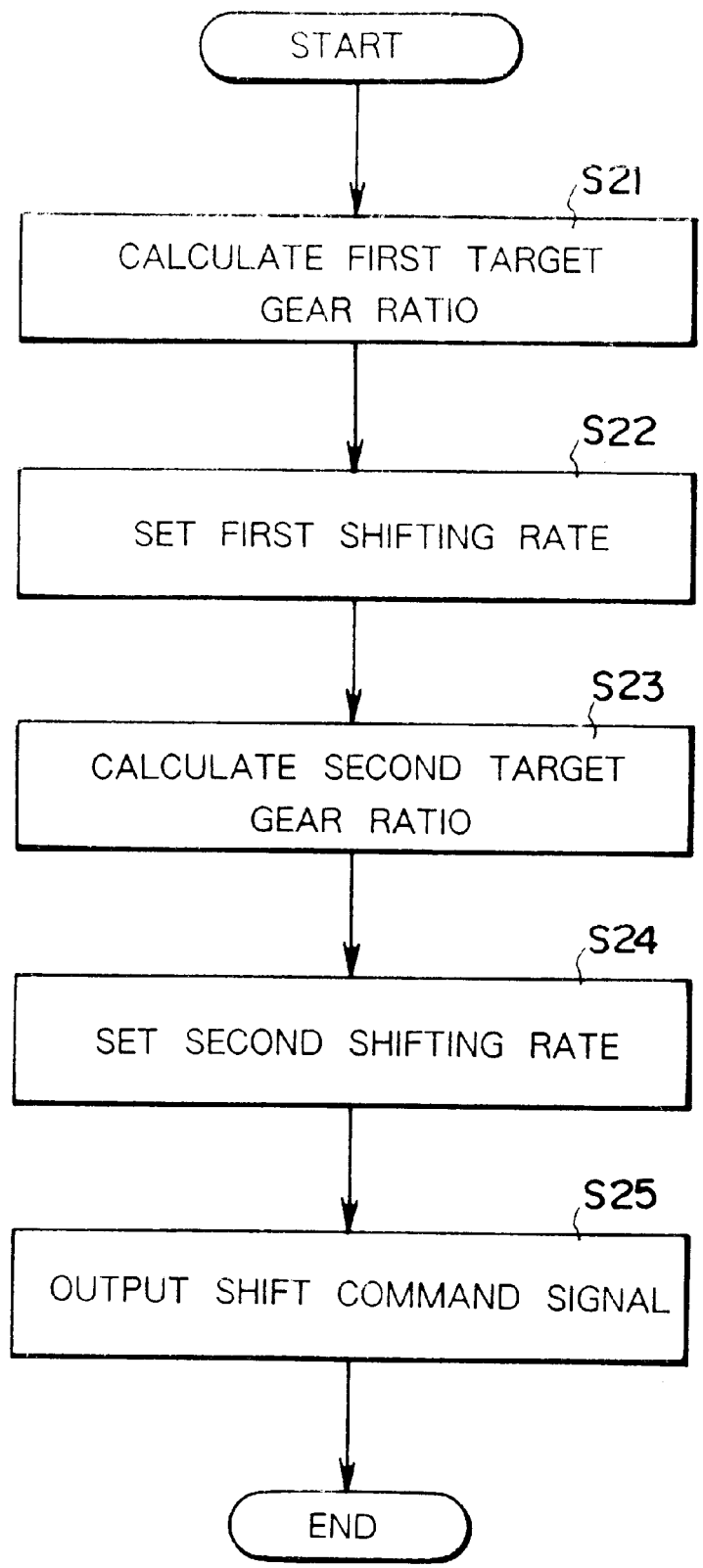
FIG. 5 is a flow chart for explaining another embodiment of the invention.

FIG. 5 shows a flow chart for explaining an example of the control. First of all, a first target gear ratio is calculated (at Step S21). The change in the running state from point D to point G is based on the acceleration demand, as described hereinbefore, so that the output torque of the engine 1 is controlled to that at a time corresponding to the target output P. In this case, the target torque at the time of the acceleration demand exceeds the maximum torque that can be outputted from the engine 1, as embodied by FIG. 2, so that the output torque of the engine 1 is controlled to the torque indicated by point E and the engine speed is controlled to the speed for the target output P, which corresponds to that torque. This is indicated by point F.

At the change from the running state indicated by point D to the running state indicated by point F, the vehicle speed may be increased by the increase in the output torque, and the engine speed at point F is higher than that at point D when a shift decision holds. In order to set the engine speed to that indicated by point F, therefore, the gear ratio has to be controlled. Therefore, the first target gear ratio takes the value which is determined by dividing the engine speed, as indicated by point F, by the vehicle speed.

Figure 6A:
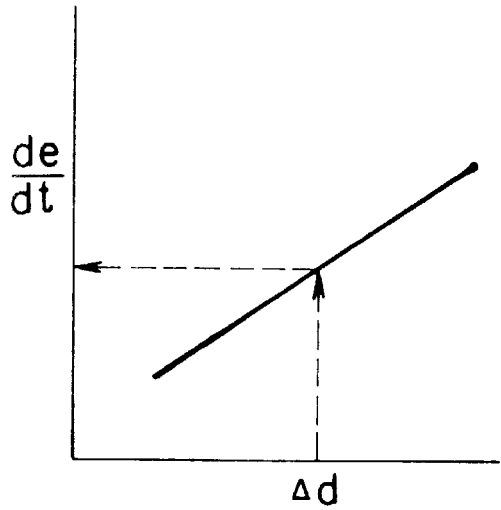
FIG. 6A is a diagram showing one example of a map for determining a shifting rate for a first shift period.
Figure 6B:
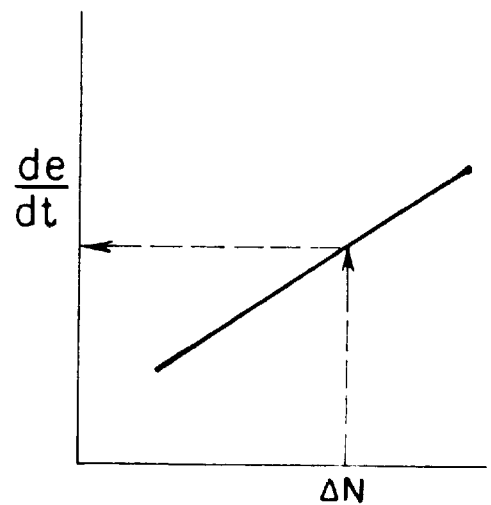
FIG. 6B is a diagram showing another example of the map for determining the shifting rate for the first shift period.

Next, if the shift to the running state, in which the torque corresponding to the target output is outputted, i.e., the shift to the first target gear ratio is assumed to occur for a first shifting period, the shifting rate for this first shifting period, i.e., a first shifting rate is set (at Step S22). This first shifting rate is preferred to be as high as possible and can be determined on the basis of a map which is preset by a shifting rate (de/dt) against a changing rate of the accelerator opening $\Delta\beta$ (or the change in the engine output), for example, as shown in FIG. 6A. Alternatively, the first shifting rate can also be determined on the basis of a map which is preset by the shifting rate (de/dt) against a difference $\Delta N$ between the target speed and the actual speed, as shown in FIG. 6B. In either case, the shifting rate (de/dt) is the higher for the larger changing rate $\Delta\beta$ of the accelerator opening or the speed difference $\Delta N$.

Moreover, a second target gear ratio is so set (at Step S23) as to establish the engine speed in the running state, as indicated by point G on the optimum running line (or the best fuel economy curve), for the target output P. The engine speed at point G corresponds to the aforementioned target speed Net, which is divided by the vehicle speed to provide the second target gear ratio.

Figure 7:
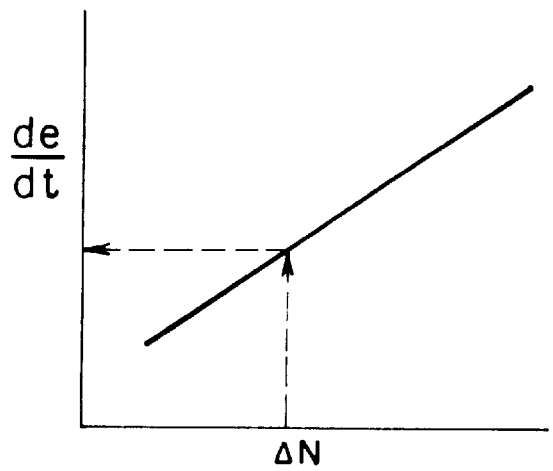
FIG. 7 is a diagram showing an example of a map for determining a shift rate for a second shift period.

A second shifting rate for the second shifting period of performing the shift to the second target gear ratio is set (at Step S24). The shifting rate for this second shifting period is set to a lower value than the aforementioned shifting rate for the first shifting period. This second shifting rate may be exemplified by a predetermined constant value. On the other hand, the shifting rate can be made lower as the driving point on the optimum running line is approached the more. The farther from the driving point, as indicated by point G in FIG. 2, on the optimum running line, more specifically, the running state has the poorer fuel economy. Therefore, the running period in the poor fuel economy state is preferably shortened by raising the shifting rate in the state apart from point G. As in the case where the shifting rate is determined for the aforementioned first shifting period, moreover, the shifting rate (de/dt) against the difference ΔN between the target speed and the actual speed may be preset as a map (as shown in FIG. 7) so that the shifting rate may be determined on the basis of the map.

There is outputted (at Step S25) a shift command signal for executing a shift at the shifting rate thus set. In the case of the aforementioned shift from point D to point G, therefore, the shift is promptly executed for the first shifting period so that the target driving force can be achieved without any delay in the shift. For the second shifting period, on the other hand, the shift proceeds more slowly than for the first shifting period so that the engine speed changes according to the change in the vehicle speed. As a result, the shortage of the accelerating force and the change in the engine speed which does not synchronize with the change in the vehicle speed (or the fluctuation of the speed) are prevented to avoid a feeling of disorder at the shifting time in advance.

Here will be described the relations between the specific examples shown in FIGS. 5 to 7 and the invention. The functions of Step S22 and Step S24 shown in FIG. 5 correspond to shifting rate control means in the invention.

Here in the control thus far described, when a change in the output is demanded by the operation of depressing the accelerator pedal, the target engine speed Net is determined so that the gear ratio of the continuously variable transmission is controlled to set the actual engine speed to the target value. When the accelerator pedal is deeply depressed, therefore, the engine speed rises to the maximum speed that is ordinarily used, so that the vehicle speed gradually rises in that state. In other words, only the engine speed changes earlier, and the vehicle speed changes later. In the ordinary vehicle having a manual transmission and a stepwise automatic transmission mounted thereon, on the contrary, the engine speed and the vehicle speed change in parallel, and a feeling of disorder may occur if only the engine speed changes earlier. The control system of the invention can also control the gear ratio to avoid such a feeling of disorder, as will be exemplified in the following.

Figure 8B:
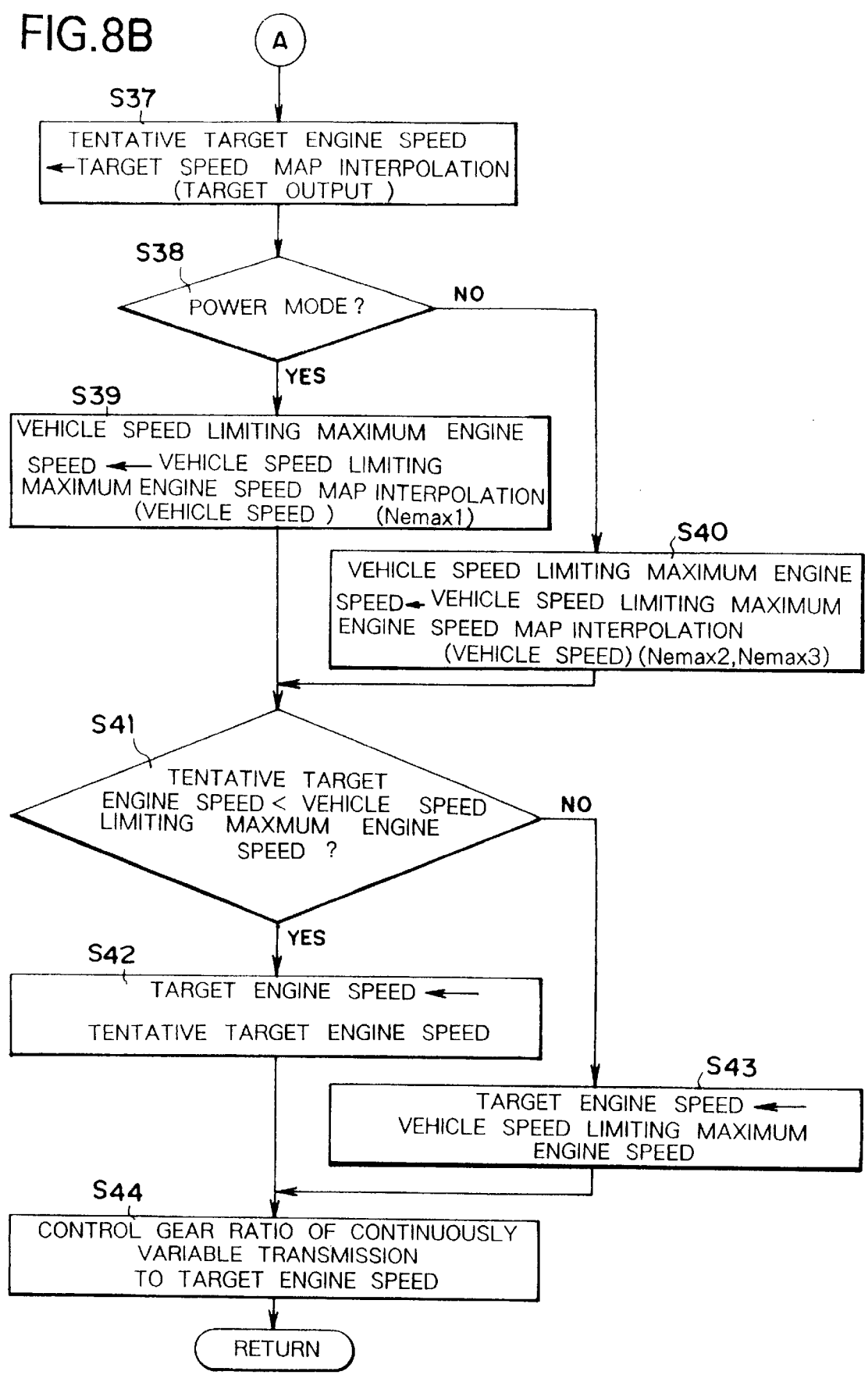
FIG. 8B is another part of the flow chart for explaining still another embodiment of the invention.

FIG. 8 is a flow chart for explaining an example of the control. The control routine, as shown in FIGS. 8A and 8B, is executed at every predetermined time periods Δt (in milliseconds). In FIGS. 8A and 8B, the accelerator opening and the vehicle speed are inputted at first (at Step S31). Next, the target driving force is determined (at Step S32) on the basis of the accelerator opening and vehicle speed thus inputted and a target driving force map stored in advance. This control of Step S32 is similar to that of Step S1 shown in FIG. 1.

The target output is calculated (at Step S33) on the basis of the target driving force and the inputted vehicle speed. This control of Step S33 is similar to that of Step S2 shown in FIG. 1. In order to control the engine 1, moreover, the engine speed is inputted (at Step S34), and the target engine torque is determined (at Step S35) from the engine speed and the target output. This control of Step S35 is similar to that of Step S5 shown in FIG. 1. The throttle opening and the fuel injection rate of the engine 1 are controlled (at Step S36) to establish the target engine torque thus determined. This control of Step S36 is similar to that of Step S6, as exemplified by the engine torque control means in FIG. 1.

On the other hand, the target engine speed is determined (at Step S37) on the basis of the target output, as determined at Step S33, and the target engine speed map (or table) stored in advance. This control of Step S37 is similar to that of Step S3 shown in FIG. 1. Since the target engine speed may be limited, as described later, the engine speed, as determined from the target output and the map, is adopted as the tentative target engine speed at Step S37 of FIG. 8B.

It is then decided (at Step S38) whether or not a power mode is selected as the running mode of the vehicle. This running mode is selected by means similar to the select means such as a mode switch which is attached to the vehicle having the automatic transmission of the prior art, for example. In the power mode, the vehicle is run with an increased driving force by raising the engine speed with a relatively high gear ratio.

Figure 9:
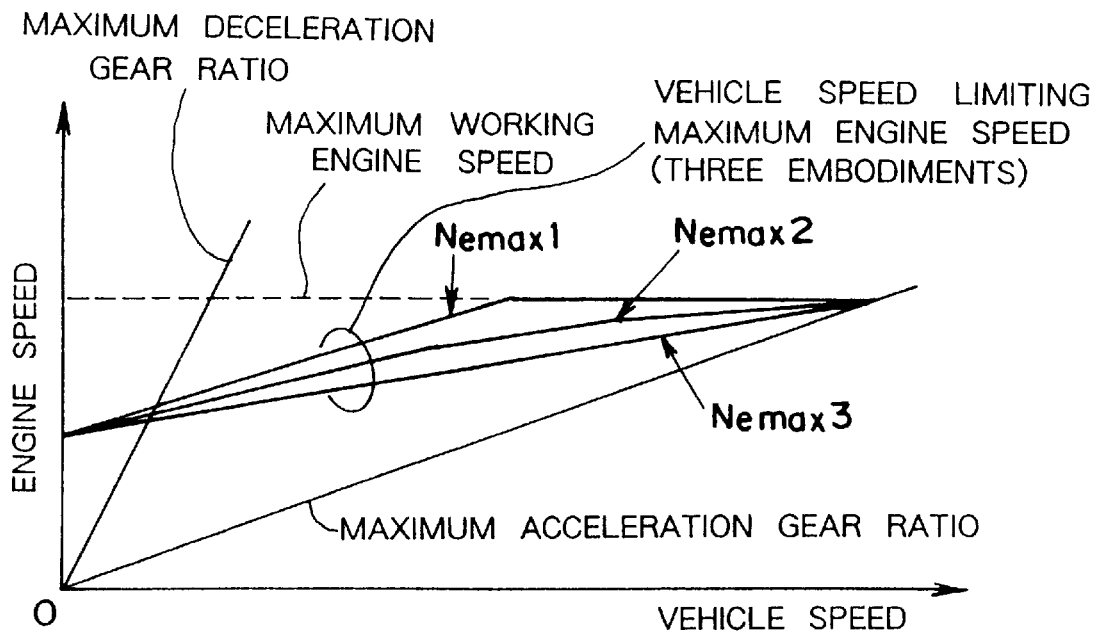
FIG. 9 is a diagram illustrating an example of a vehicle speed limiting maximum engine speed map.

When the answer of Step S38 is affirmative because the power mode is selected, the vehicle speed limiting maximum engine speed is set (at Step S39) on the basis of the vehicle speed limiting maximum engine speed map. An example of this vehicle speed limiting maximum engine speed map is shown in FIG. 9. When the power mode is selected, the vehicle speed limiting maximum engine speed is set according to a map, as indicated by letters Nemax1 in FIG. 9. This map raises the vehicle speed limiting maximum engine speed gradually according to the rise in the vehicle speed. In this map, the rising gradient is set to the highest, and the engine speed is set to reach the maximum working engine speed before the gear ratio reaches the maximum acceleration gear ratio. Here, the maximum working engine speed maximizes the output and is set for each engine 1.

When the answer of Step S38 is negative because the power mode is not selected, on the contrary, the vehicle speed limiting maximum engine speed is set (at Step S40) on the basis of a map, as indicated by letters Nemax2 or Nemax3 in FIG. 9. These maps Nemax2 and Nemax3 lower the engine speed by using a relatively small gear ratio. Of these, the map Nemax2 is set such that the increasing gradient of the vehicle speed limiting maximum engine speed drops in two stages in accordance with the rise in the vehicle speed to establish the maximum working engine speed at the maximum acceleration gear ratio. On the other hand, the map Nemax3 is set such that the vehicle speed limiting maximum engine speed rises linearly.

The vehicle speed limiting maximum engine speed thus determined and the aforementioned tentative target engine speed are compared (at Step S41). When the tentative target engine speed determined at Step S37 is lower than the vehicle speed limiting maximum engine speed, the answer of Step S41 is affirmative. When the depression of the accelerator pedal is so small that the demand for raising the output is small, more specifically, the tentative target engine speed is lowered to affirm the answer of Step S41. In this case, the routine advances to Step S42, at which the tentative target engine speed determined at Step S37 is adopted as the target engine speed.

When the demand for raising the output (i.e., the acceleration demand) is large, on the contrary, the tentative target engine speed becomes so high that the answer of Step S41 is negative. Since the tentative target engine speed exceeds the vehicle speed limiting maximum engine speed, more specifically, the vehicle speed limiting maximum engine speed, as determined from the map, is adopted as the target engine speed (at Step S43). In short, the target engine speed is limited.

Moreover, the gear ratio of the continuously variable transmission is controlled (at Step S44) to the target engine speed which has been set at Step S42 or Step S43). This control of Step S44 is similar to that by the shift control means at Step S4 shown in FIG. 1.

In the control shown in FIGS. 8A and 8B, therefore, when the demand for raising the output is high, the target engine speed is not set to the speed based on the target output but limited to the speed according to the vehicle speed. As a result, the target engine speed, i.e., the upper limit of the engine speed is raised as the engine torque rises so that the vehicle speed becomes high. As a result, the engine speed rises with the rise in the vehicle speed. In other words, the engine speed is suppressed to some extent at the acceleration time so that the noise at the acceleration time can be lowered. Since the rise in the engine speed occurs according to the increase in the vehicle speed, on the other hand, a deviation between the speed to be physically felt and the behavior of the engine 1 can be reduced to avoid the feeling of disorder. Since the manner to limit the target engine speed is made different for the running mode selected, on the other hand, the acceleration and the quietness according to the demand of the driver can be achieved to effect the run demanded by the driver.

Here will be described the relations between the system for the aforementioned control shown in FIGS. 8A and 8B and the invention. The functions of Step S39 and Step S40 correspond to target speed limiting means in the invention.

Here in the aforementioned embodiment shown in FIGS. 8A, 8B and 9, the limiting value of the target engine speed is changed according to the vehicle speed. In short, the limiting value of the target engine speed may be gradually changed after a demand is made for changing the output. For example, the limiting value of the target engine speed may be changed stepwise or continuously at every constant time intervals after the control starts or may alternatively changed according to another parameter other than the vehicle speed. In the foregoing embodiment, on the other hand, the value based on the depression of the accelerator pedal is adopted as the accelerator opening. In this invention, however, the accelerator opening signal can be exemplified by the output demand signal which is outputted from the cruise control device for keeping the vehicle speed, for example, at a value set by the driver.

As now understood from the foregoing individual specific embodiments, the control system of the invention is constructed to calculate the target engine speed and the target engine torque from the target output and to control the gear ratio of the continuously variable transmission and the output torque of the engine. Even when a trouble or malfunction occurs in the power transmission line from the engine 1 to the drive wheels or in its control system, therefore, it is preferable to control the gear ratio of the continuously variable transmission and the output torque of the engine simultaneously, as will be exemplified in the following.

Figure 11:
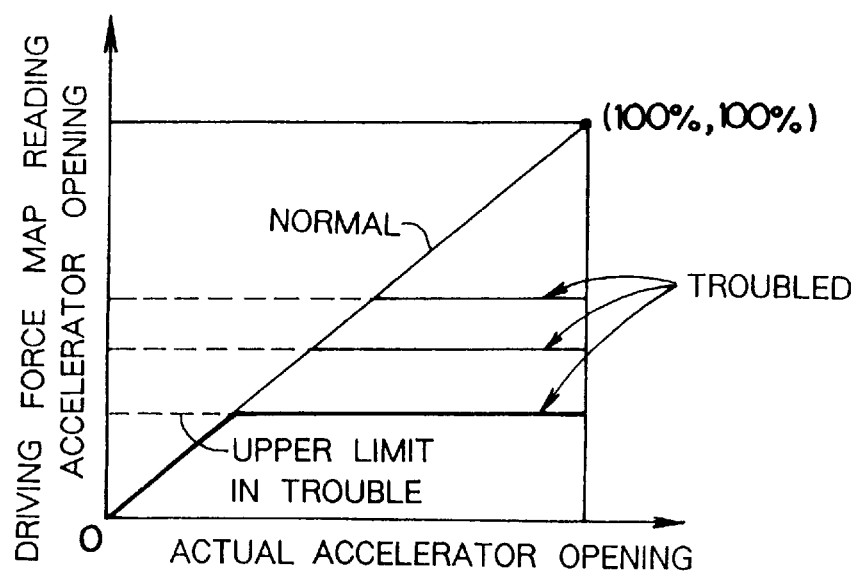
FIG. 11 is a diagram illustrating one example of a map for limiting an accelerator opening in a trouble.

FIGS. 10A, 10B and 11 show an embodiment for the control, which is constructed to limit the accelerator opening so as to limit the target output at the time of a trouble. Specifically, the control routine shown in FIGS. 10A and 10B is executed at every predetermined time periods Δt (in milliseconds). First of all, the actual accelerator opening and the vehicle speed are inputted (at Step S51). Here, the actual accelerator opening is the angle of depression of the accelerator pedal, which is electrically processed to achieve the accelerator opening.

It is then decided (at Step S52) whether or not a trouble has occurred. In short, this trouble is one both in the power transmission line including the continuously variable transmission 6 from the engine 1 to the drive wheels and in a line for controlling the former line. The trouble covers those not only in the electronic control unit 4 for controlling the engine 1 and the electronic control unit 9 for the continuously variable transmission 6 but also in the throttle opening sensor for detecting the throttle opening of the engine 1, an air flow meter for detecting the intake air flow of the engine 1, a fuel feed line to the engine 1, an intake control valve for controlling the air intake of the engine 1, an electronic throttle valve, an EGR valve for circulating the exhaust gas to the engine 1, a shift control valve in the continuously variable transmission 6, and a rotating speed sensor. These troubles can be detected in terms of an inconsistency between the command signal and the detected signal, for example.

When the answer of Step S52 is negative because no trouble is detected, the actual accelerator opening is adopted as the mapping accelerator opening (at Step S53). This will be illustrated in FIG. 11, in which a value corresponding in one-to-one relation to the actual depression of the accelerator pedal is set as the accelerator opening Acc to be used for determining the target driving force at Step S1 of FIG. 1, so that it is used as the accelerator opening in the normal state in which no trouble occurs.

When the answer of Step S52 is negative because a trouble is detected, on the contrary, it is decided (at Step S54) whether or not the actual accelerator opening is smaller than the limiting value in the trouble. This limiting value in the trouble is provided for limiting the output of the engine 1 in accordance with the state of trouble detected and is set to a constant value according to the content of trouble, as shown in FIG. 11.

When the actual accelerator opening is smaller than the limiting value in the trouble so that the answer of Step S54 is affirmative, the actual accelerator opening is adopted (at Step S53) as the mapping accelerator opening, i.e., the accelerator opening to be used for the control. When the actual accelerator opening is larger than the limiting value in trouble so that the answer of Step S54 is negative, on the contrary, the limiting value in trouble is adopted (at Step S55) as the accelerator opening for determining the mapping accelerator opening, i.e., the target driving force. When a trouble is detected, therefore, the accelerator opening to be adopted for the control is limited to a small value even if the actual accelerator opening is large.

A target driving force is determined (at Step S56) on the basis of the mapping accelerator opening thus determined, the vehicle speed and the map stored in advance. On the basis of the target driving force and the vehicle speed, moreover, the target output is determined (at Step S57). These functions of Step S56 and Step S57 are similar to either those of Step S1 and Step S2 shown in FIG. 1 or those of Step S32 and Step S33 shown in FIG. 8A.

As in the control example shown in FIG. 1 or in the control example shown in FIGS. 8A and 8B, moreover: the engine speed is inputted (at Step S58); the target engine torque is calculated (at Step S59) from the engine speed and the target output; and the throttle opening and the fuel injection rate are controlled (at Step S60) to establish the target engine torque. Simultaneously with this, on the other hand, the target engine speed is determined (at Step S61) on the basis of the target output and the target engine speed table (or map) stored in advance, and the gear ratio of the continuously variable transmission 6 is controlled (at Step S62) to establish the target engine speed. These controls of Step S61 and Step S62 are similar to those of Step S3 and Step S4 shown in FIG. 1 or those of Step S37 and Step S44 shown in FIG. 8B.

When a trouble is detected, therefore, the accelerator opening is limited according to the content of trouble so that the target driving force to be determined on the basis of the accelerator opening takes a small value and so that the target output to be determined on the basis of the target driving force takes a smaller value than that at the normal time. The output of the engine 1 and the gear ratio of the continuously variable transmission 6 are controlled to achieve that target output so that the engine torque and the output shaft torque of the continuously variable transmission 6 or the driving torque are limited to lower values than those at the normal time. As a result, the driving force for the run at a trouble time can be retained as much as possible, and an excessive torque in the trouble can be prevented from occurring to prevent a damage in the power transmission line or a deterioration in the damage.

Thus, here will be described relations between the specific example for executing the controls shown in FIGS. 10A, 10B and 11 and the invention. In FIG. 10A, the function of Step S52 corresponds to trouble detecting means in the invention, and the function of Step S55 corresponds to limit means in the invention. On the other hand, the function of Step S55 provides means for setting a limiting value of the target output for each content of trouble detected.

Here, in place of the aforementioned setting of the shifting rate for the second shifting period, the shift control may be executed by setting the duration of the first shifting period. This duration of the shifting period can be determined, for example, according to the changing rate of the accelerator opening and the difference between the target revolution speed and the actual rotating speed. On the other hand, the foregoing example has described the case in which the target torque exceeds the maximum torque of the engine 1 for an acceleration. However, the aforementioned shift control can be also executed in the case of acceleration or deceleration in which the target torque does not exceed the maximum torque of the engine.

On the other hand, the foregoing specific embodiments have described the case in which the power source is the internal combustion engine. However, the invention should not be limited to the foregoing embodiments but can be applied to a vehicle of another type such as a vehicle in which an electric motor and an internal combustion engine are combined to provide the power source. In this modification, the internal combustion engine may be controlled along the optimum running line, and the electric motor may be controlled to change its output to the running point on the aforementioned equal output lines and from this running point to the running point on the optimum running line. On the other hand, the change in the shifting rate may occur at a plurality of stages and should not be limited to the aforementioned two stages.

Here will be synthetically described the advantages of the invention. According to the invention, as has been described hereinbefore, when a demand for acceleration/deceleration is made, the target torque is determined on the basis of the output speed (or output angular velocity) of the power source at the demand time and the target output of the power source, and the power source is controlled to output the torque and is then controlled to the target output, so that a driving torque satisfying the acceleration/deceleration demand can be achieved. As a result, the power performance or the drivability of the vehicle can be improved better than that of the prior art.

According to the invention, on the other hand, the target driving force can be determined on the basis of the preset map so that the output demand and the acceleration characteristics can be easily set.

According to the invention, moreover, when the target output is determined, for example, the target output torque is determined from the target output, and the power source is controlled to generate the target output torque. If a shift is made on the basis of the demand for increasing the output, for example, the gear ratio is promptly changed to establish the speed of the power source according to the target output. As a result, a driving force satisfying the demand can be achieved, and the speed of the power source does not change independently of the change in the vehicle speed. After the target output is achieved, moreover, the gear ratio is slowly changed at the time of a shift to the target output speed preset for that output, so that the change in the vehicle speed and the change in the rotating speed of the power source match each other. This makes it possible to establish an acceleration/deceleration satisfying the demand and to execute a shift without the feeling of disorder.

According to the invention, even when a change in the output demand is high, the output speed of the power source does not instantly change to the target speed preset for the target output but becomes one determined by the limiting value, and the rotating speed of the power source gradually changes to the target value preset for the target output, in accordance with the change in the limiting value. When a demand for an acceleration is made, for example, the rotating speed of the power source changes in relation to the rise in the vehicle speed so that the change in the behavior of the power source coincides with the change in the behavior of the vehicle. As a result, the feeling of disorder can be avoided in advance, and the rotating speed of the power source can be suppressed to damp the noise.

According to the invention, moreover, when a trouble is detected, the control to limit the target output is executed so that the target output becomes lower than the value satisfying the output demand thereby to reduce the output torque of the power source to be set on the basis of the target output and the gear ratio of the continuously variable transmission. Therefore, an excessive load can be prevented in advance from being applied in a trouble to the power transmission line to which the output of the power source is applied, thereby to protect the power transmission line effectively, and the vehicle can be run while retaining the driving force as much as possible even in the state of trouble.

What is claimed is:

1. A control system of a vehicle having a continuously variable transmission, for controlling a power source to achieve a target output torque determined on the basis of an output demand and for controlling a gear ratio of said continuously variable transmission to a gear ratio determined on the basis of the output demand, comprising:

means for determining a target driving force on the basis of said output demand and a vehicle speed;

means for determining a target output of said power source to achieve the target driving force;

means for determining a target output torque of said power source on the basis of said target output and an actual output speed of said power source;

power source control means for controlling said power source to achieve the target output torque;

means for determining a target output speed preset for the target output; and gear ratio control means for controlling the gear ratio of said continuously variable transmission so that an actual output speed of said continuously variable transmission may be its target output speed after said power source was controlled to output said target output torque.

2. A control system according to claim 1, wherein said gear ratio control means includes means for controlling the gear ratio without changing the output of said power source after the output torque of said power source was controlled to said target output torque, so that the output speed of said power source may become the target output speed.

3. A control system according to claim 1, further comprising:

another gear ratio control means for controlling said gear ratio when the output torque of said power source is to be controlled to said target output torque by the change in said output demand.

4. A control system according to claim 3, wherein said another gear ratio control means includes means for changing the gear ratio faster than a shifting rate at which the gear ratio is changed after said power source was controlled to the target output torque.

5. A control system according to claim 4, wherein said another gear ratio control means includes means for determining a changing rate of the gear ratio on the basis of a changing rate of the output of said power source.

6. A control system according to claim 4, wherein said another gear ratio control means includes means for determining the changing rate of the gear ratio on the basis of a difference between the actual speed of said power source and said target output speed.

7. A control system according to claim 4, wherein said another gear ratio control means includes means for determining a duration of a shift period, for which the gear ratio is changed, on the basis of the changing rate of the output of said power source.

8. A control system according to claim 4, wherein said another gear ratio control means includes means for determining the duration of a shift period, for which the gear ratio is changed, on the basis of the difference between the actual speed of said power source and said target output speed.

9. A control system according to claim 4, wherein said gear ratio control means includes means for determining the changing rate of the gear ratio so that the output speed of said power source may reach said target speed within a predetermined time period.

10. A control system according to claim 4, wherein said gear ratio control means includes means for lowering the changing rate of the gear ratio as the output speed of said power source approaches said target output speed.

11. A control system according to claim 4, wherein said gear ratio control means includes means for determining the changing rate of the gear ratio on the basis of the difference between the actual speed of the power source and said target output speed.

12. A control system according to claim 1, wherein said target driving force determining means includes means for determining the target driving force on the basis of a map in which a driving force is determined in relation to the output demand and the vehicle speed.

13. A control system according to claim 1, further comprising:

shifting rate control means for changing the changing rate of the gear ratio of said continuously variable transmission in at least two quick and slow stages till the actual speed of said power source reaches said target output speed.

14. A control system according to claim 13, wherein said shifting rate control means includes means for lowering the changing rate of the gear ratio of said continuously variable transmission as the actual speed of said power source approaches said target output speed.

15. A control system according to claim 1, further comprising:

target speed limiting means for limiting a target output speed of said power source to a predetermined limiting value and for changing said limiting value gradually to said target output speed which is determined by the means for determining the target output speed which is preset for said target output.

16. A control system according to claim 15, further comprising:

running mode selecting means for selecting a plurality of running modes for which driving force for the run are different from each other, wherein said target speed limiting means includes means for making the limiting value of the target output speed of said power source different for each of the running modes.

17. A control system according to claim 15, further comprising:

running mode selecting means for selecting a plurality of running modes for which driving force for the run are different from each other, wherein said target speed limiting means includes means for setting the limiting value of the target output speed of said power source, when a running mode for a high driving force is selected, to a higher value than that of the case in which a running mode for a low driving force is selected.

18. A control system according to claim 15, further comprising:

running mode selecting means for selecting a plurality of running modes for which driving forces for the run are different from each other, wherein said target speed limiting means includes means for making a changing tendency of the limiting value of the target output speed of said power source different for each of the running modes.

19. A control system according to claim 15, further comprising:

running mode selecting means for selecting a plurality of running modes for which driving forces for the run are different from each other, wherein said target speed limiting means includes means for setting the changing tendency of the limiting value of the target output speed of said power source, when a running mode for a high driving force is selected, to a more abruptly changing tendency than that of the case in which a running mode for a low driving force is selected.

20. A control system according to claim 1, further comprising:

trouble detecting means for detecting a trouble in either of said power source and said continuously variable transmission or in a control system for either of said power source and said continuously variable transmission; and limit means for executing a limiting control to limit said target output when said trouble detecting means detects a trouble.

21. A control system according to claim 20, wherein said limiting means includes means for making a limiting content different according to a content of said trouble.

22. A control system according to claim 20, wherein said limiting means includes means for limiting the output demand which is inputted as control data.

23. A control system according to claim 20, wherein said limiting means includes means for limiting the target driving force which is determined on the basis of the output demand.

24. A control system according to claim 20, wherein said limiting means includes means for limiting the target output which is determined on the basis of the target driving force.

* * * * *